C. I. LOTT.
ROLLER BEARING.
APPLICATION FILED MAR. 16, 1920.
1,426,578.
Patented Aug. 22, 1922.
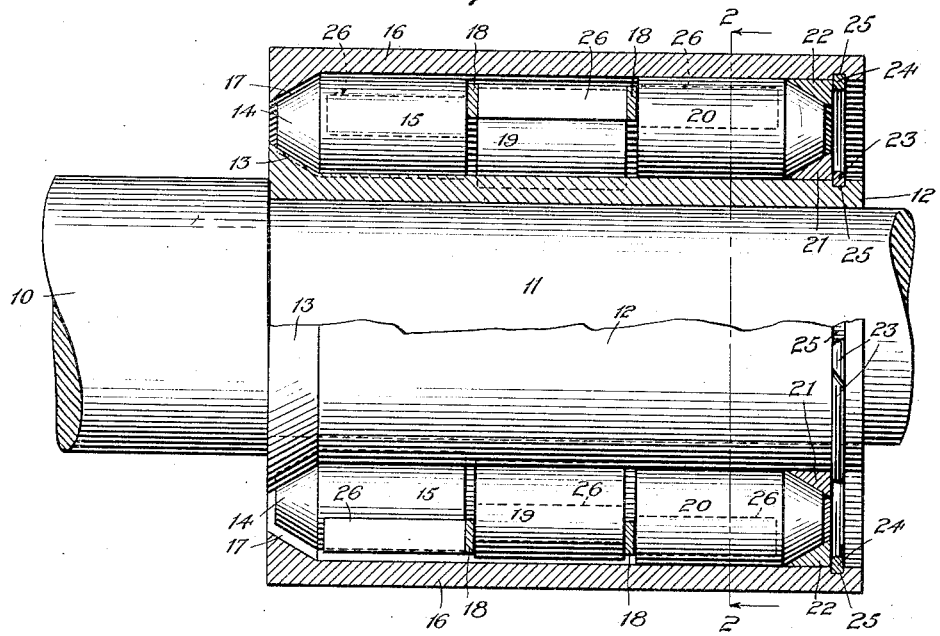
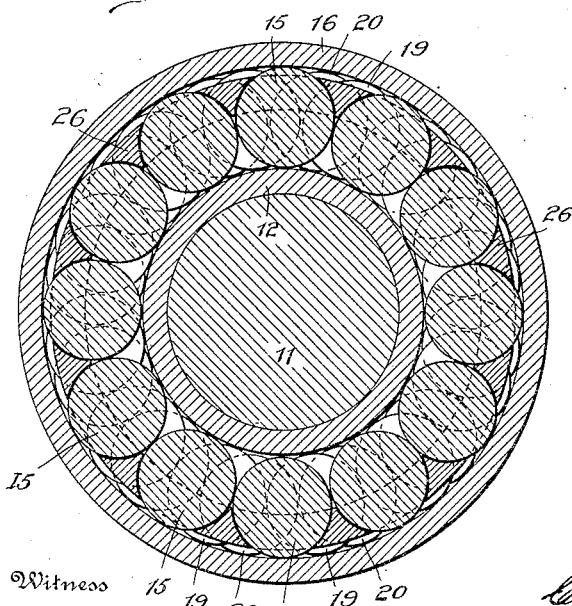
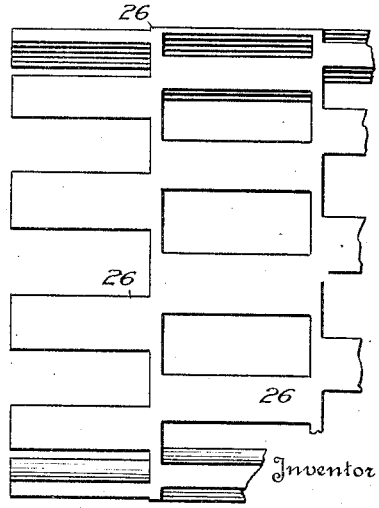

UNITED STATES PATENT OFFICE.

CHARLES I. LOTT, OF PEARSON, GEORGIA.

ROLLER BEARING.

1,426,578. Specification of Letters Patent. Patented Aug. 22, 1922.

Application filed March 16, 1920. Serial No. 366,222.

*To all whom it may concern:*

Be it known that I, CHARLES I. LOTT, a citizen of the United States, and resident of Pearson, in the county of Atkinson and State of Georgia, have invented certain new and useful Improvements in Roller Bearings, of which the following is a specification, reference being had therein to the accompanying drawing.

This invention relates to roller bearings especially, but not exclusively, adapted for use with the axles of vehicles, and among its objects are providing a very strong, durable, inexpensive, and readily replaced device which saves substantially all wear on wheels and axles, or the like, with which it is used. Non-spherical rollers are preferred since they are stronger, more easily made and neither wear nor are worn rapidly.

In the accompanying drawings,

Figure 1 shows in section a part of a bearing mounted on an axle.

Figure 2 shows a sleeve on the line 2—2, Figure 1.

Figure 3 is a side view of a portion of a roller cage.

In these figures, 10 represents an axle of a car, or the like, having a diminished portion 11 upon which is removably fixed a protecting sleeve 12 having at one end an external annular shoulder, provided with an inclined face to receive the frusto-conical ends 14 of a set of rollers 15 spaced around the sleeve and in contact therewith. These rollers are enclosed in an outer sleeve 16 having at its inner end an internal annular shoulder 17 to fit against the same ends of the rollers. At the opposite ends the rollers are cut perpendicular to their axes, and spaced from them by cage members 18 are the rollers 19 of a corresponding set, and beyond these and similarly spaced therefrom are rollers 20 like the rollers 15 but reversed so that their conical ends are most distant from the rollers of the first mentioned set. Against the inclined faces of these rollers fit cone faced rings 21, 22, one fitting over the sleeve 12 and the other fitting in the sleeve 16, the rings being held in place, respectively, by divided annular spring metal members 23, 24 which fit in grooves in the sleeves and have their exposed sides rounded so that they easily enter annular recesses 25.

The three sets of rollers are held in a cage 26 shorter than the sleeves having its spaces for the inner and outer sets of rollers terminally open, and which keeps the sets apart and spaces the rollers in each set. When in place, the rollers are staggered in a peculiar way. The inner terminal set may consist of any desired number of rollers 15, and these are uniformly spaced giving uniformly spaced lines of contact. The rollers 19 of the next set are offset so that their lines of contact are a little at one side of the corresponding lines of the first set, and the rollers 20 of the third set are similarly offset, the angular displacement of the successive sets being such that no line of contact of any of the many rollers coincides with the line of contact of any other roller. It follows that the strain of heavy loads is distributed, as shown in Figure 2, at all times among many rollers, no two of which are alined, and that strain and wear are thus reduced to a minimum.

In assembling the device, if the roller holding devices are not such as to hold all the rollers securely when out, the inner rollers are inserted in the cage and pushed between the bearing sleeves, and the other sets are added in succession. The beveled rings are added and the annular holding wires are sprung into place.

The bearing may be used in various situations. For example, an axle such as shown may rotate with a wheel fixed thereon, the outer sleeve supporting the load but not rotating, or a wheel may be fixed to and rotate with the outer sleeve, the load being carried by the axle.

These general ways of mounting wheels and carrying the load are well known and commonly used, and hence it is not thought necessary to illustrate the uses suggested. The bearing as a whole may be made of standard sizes and sold in commerce for any desired use, the sleeve 12 being fixed in any convenient way upon a rotary or non-rotary axle or shaft of any kind.

Obviously, the number of sets of rollers is varied at will, although three are shown.

What I claim is:

1. The combination with a sleeve adapted to be secured in place upon a shaft, of a plurality of distinct annular series of cylindrical rollers, the outer ends of the rollers of each terminal series being frusto-conical, a cage spacing the series and the rollers of each series, a second sleeve enclosing the rollers and cage, both said sleeves having at one end flanges fitting opposite sides of the frusto-conical ends of the rollers of one terminal series, bevelled rings fitting the inner and outer sides, respectively, of the frusto-conical ends of the rollers of the opposite terminal series, and readily releasable means for holding the rings in place between the sleeves.

2. In a roller bearing, the combination with a sleeve having an external annular beveled flange at one end, of a larger concentric sleeve having at the corresponding end an analogous internal flange, like beveled rings fitting the exterior of the inner sleeve and the interior of the outer sleeve, longitudinally spaced sets of annularly spaced rollers fitting the space between the sleeves, the rollers of the terminal sets fitting against said flanges and rings respectively.

3. The combination with a protecting sleeve to be removably fixed upon a shaft and having at one end an external beveled annular flange, of a plurality of longitudinally spaced sets of bearing rollers annularly spaced in each set and the rollers of terminal sets being provided with conical terminal faces, a second sleeve enclosing the sets of rollers and having a beveled internal flange coacting with the beveled flange first mentioned in receiving the conical faces of one set of rollers, beveled flanges fitting the conical roller faces of one set of rollers, beveled rings fitting the conical roller faces at the opposite end of the bearing, and means for holding the rings against moving from the adjacent rollers.

4. The combination with longitudinally spaced annular sets of circumferentially spaced rollers having the outer ends of the rollers of each terminal set provided with conical faces, of sleeves fitting, respectively, the interior and exterior of said sets and provided with beveled annular projecting members fitting said faces, and a cage spacing the sets and the rollers in each set and lying wholly within the outer end planes of the terminal sets.

In testimony whereof I hereunto affix my signature.

CHARLES I. LOTT.